(12) United States Patent
Shusterman

(10) Patent No.: US 9,258,689 B1
(45) Date of Patent: Feb. 9, 2016

(54) TRANSFER OF TRIMMED COMMERCIAL MOBILE ALERT SYSTEM MESSAGES

(71) Applicant: Sprint Communications Company L.P., Overland Park, KS (US)

(72) Inventor: Alex Shusterman, Vienna, VA (US)

(73) Assignee: Sprint Communications Company L.P., Overland Park, KS (US)

( * ) Notice: Subject to any disclaimer, the term of this patent is extended or adjusted under 35 U.S.C. 154(b) by 58 days.

(21) Appl. No.: 14/206,815

(22) Filed: Mar. 12, 2014

(51) Int. Cl.
*H04M 11/04* (2006.01)
*H04W 4/22* (2009.01)

(52) U.S. Cl.
CPC ..................... *H04W 4/22* (2013.01)

(58) Field of Classification Search
CPC ....... H04W 4/22; H04W 4/021; H04W 64/00; H04W 4/06; H04W 84/047; H04W 76/002; H04W 4/003; H04W 68/00
USPC ...................................................... 455/404.1
See application file for complete search history.

(56) References Cited

U.S. PATENT DOCUMENTS

| 2009/0291630 | A1 | 11/2009 | Dunn et al. |
| 2012/0295536 | A1 | 11/2012 | Klatt |
| 2014/0112251 | A1* | 4/2014 | Kim et al. ...................... 370/328 |

FOREIGN PATENT DOCUMENTS

WO 2013046177 4/2013

* cited by examiner

*Primary Examiner* — Tu X Nguyen

(57) ABSTRACT

Systems, methods, and software for transferring Commercial Mobile Alert System (CMAS) messages over wireless communication networks are provided herein. In one example, a method of operating a management node in a wireless communication network is provided that includes receiving a CMAS message transferred by an emergency authority system for transfer over the wireless communication network, the CMAS message accompanied by a payload list of wireless access nodes that are affected by the CMAS message. The method includes processing the CMAS message and the payload list to determine if wireless access nodes associated with a tracking area handled by the management node are indicated by the payload list. The method includes determining a trimmed payload list that includes at least one of the wireless access nodes, and transferring the CMAS message with the trimmed payload list for delivery to the at least one of the wireless access nodes.

18 Claims, 6 Drawing Sheets

TRANSFER OF TRIMMED COMMERCIAL MOBILE ALERT SYSTEM MESSAGES

TECHNICAL FIELD

Aspects of the disclosure are related to the field of wireless communication systems and wireless communication networks.

TECHNICAL BACKGROUND

Wireless communication systems, such as cellular voice and data networks, typically include multiple wireless access nodes spread over various geographic areas through which wireless communication devices can register and receive wireless access to communication services. In many examples, the wireless communication devices are mobile, and can move between wireless coverage areas of the wireless access nodes to receive wireless service.

Emergency notifications can be sent to the wireless communication devices to alert these wireless communication devices to various emergency situations, such as due to weather, accidents, presidential alerts, abductions, or other emergency events. However, these emergency events might only apply to a certain geographic region, and not apply to other geographic regions. When a wireless communication network, such as provided by a wireless carrier, provides wireless services over a large geographic region, these emergency notifications might only apply to a portion of the geographic region handled by the wireless carrier.

As an example of emergency notifications, the Commercial Mobile Alert System (CMAS) has been established to transfer emergency messages to users of a wireless communication network. CMAS messages can be originated by emergency authority systems for transfer over a geographic region by a wireless carrier. The CMAS messages can be delivered to wireless communication devices and can appear much like Short Message Service (SMS) text messages.

OVERVIEW

Systems, methods, and software for transferring Commercial Mobile Alert System (CMAS) messages to users of wireless communication networks are provided herein. In one example, a method of operating a management node in a wireless communication network is provided. The method includes receiving a CMAS message transferred by an emergency authority system for transfer to users over the wireless communication network, the CMAS message accompanied by a payload list of wireless access nodes that are affected by the CMAS message. The method includes processing at least the CMAS message and the payload list to determine if one or more wireless access nodes associated with a tracking area handled by the management node are indicated by the payload list. When the one or more wireless access nodes associated with the tracking area are indicated by the payload list, the method includes determining a trimmed payload list that includes at least one of the wireless access nodes associated with the tracking area and omits at least wireless access nodes not associated with the tracking area, and transferring the CMAS message with the trimmed payload list for delivery to the at least one of the wireless access nodes.

In another example, a management node of a wireless communication network is provided. The management node includes a communication transceiver configured to receive a CMAS message transferred by an emergency authority system for transfer to users over the wireless communication network, the CMAS message accompanied by a payload list of wireless access nodes that are affected by the CMAS message. The management node includes a processing system configured to process at least the CMAS message and the payload list to determine if one or more wireless access nodes associated with the tracking area are indicated by the payload list. When the one or more wireless access nodes associated with the tracking area are indicated by the payload list, the processing system is configured to determine a trimmed payload list that includes at least one of the wireless access nodes associated with the tracking area and omits at least wireless access nodes not associated with the tracking area. The communication transceiver is configured to transfer the CMAS message with the trimmed payload list for delivery to the at least one of the wireless access nodes.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

DETAILED DESCRIPTION

Figure 1:
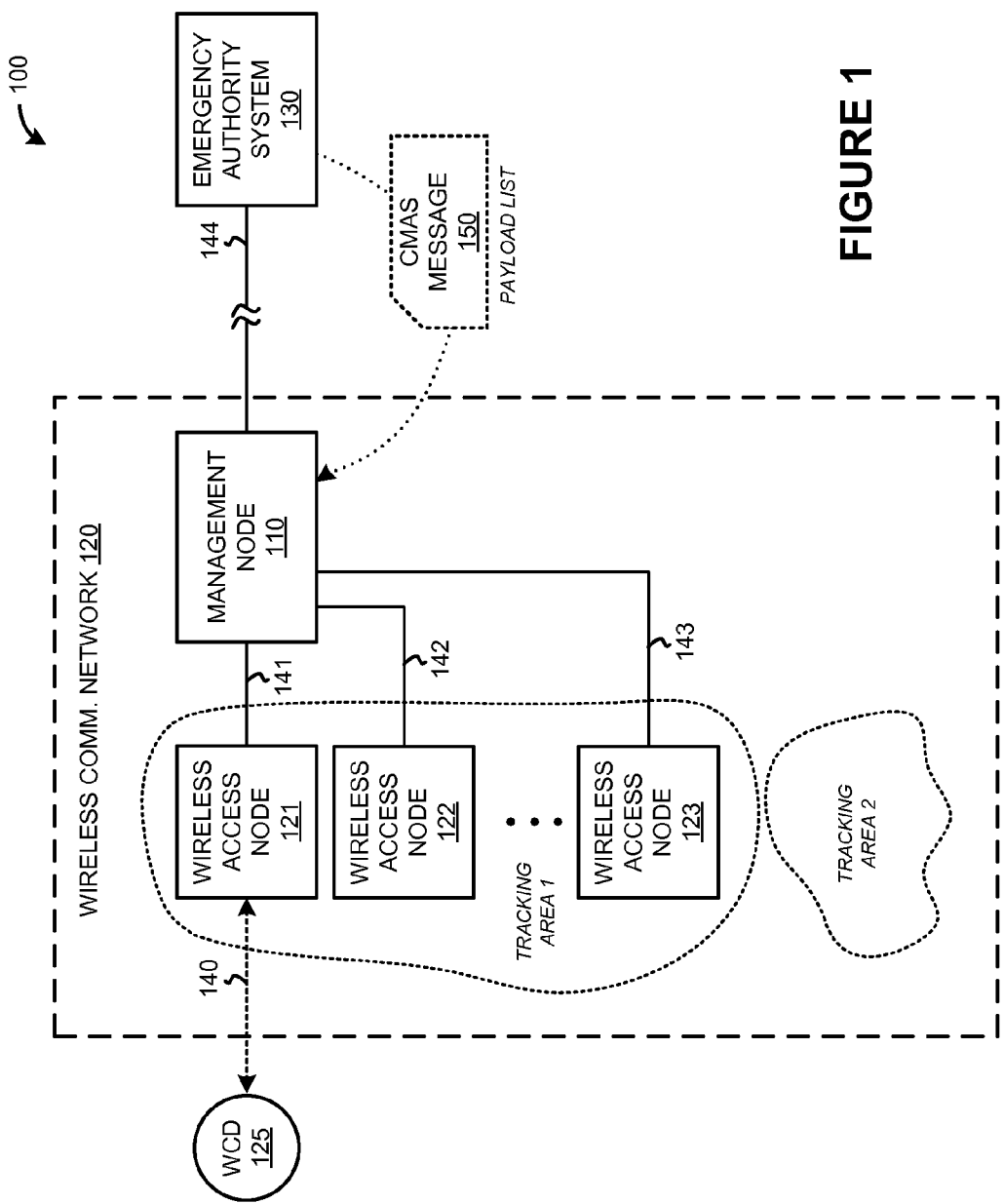
FIG. 1 is a system diagram illustrating a communication system.

FIG. 1 is a system diagram illustrating communication system 100.

Communication system 100 includes management node 110, wireless access nodes 121-123, wireless communication device (WCD) 125, and emergency authority system 130. In FIG. 1, management node 110 and wireless access nodes 121-123 are included in wireless communication network 120, although other elements not shown in FIG. 1 can be included. WCD 125 receives wireless access to communication services from elements of wireless communication network 120. The communication services can include voice calls, text messages, data access, Internet access, among other services.

In operation, emergency authority system 130 can originate and transfer emergency messages for delivery over wireless communication network 120 to user devices. The emergency messages can comprise Commercial Mobile Alert System (CMAS) messages which can indicate emergency situations in a textual message, such as due to weather, accidents, presidential alerts, abductions, or other emergency events. Management node 110 can receive these emergency messages and subsequently deliver the emergency messages over one or more wireless access nodes for delivery to end user devices. Although one end user device, namely WCD 125, is shown in FIG. 1, it should be understood than any number of end user devices can be included.

Figure 2:
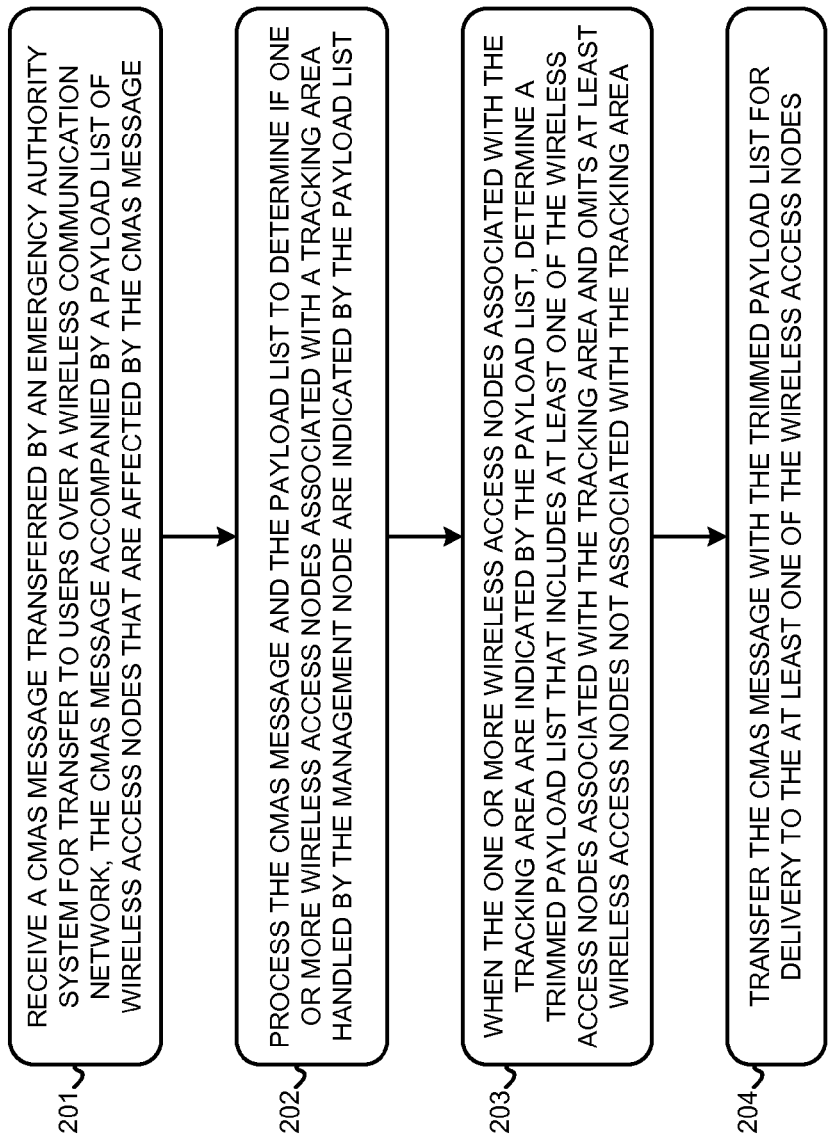
FIG. 2 is a flow diagram illustrating a method of operation of a management node.

FIG. 2 is a flow diagram illustrating a method of operation of management node 110. The operations of FIG. 2 are referenced below parenthetically. In FIG. 2, management node 110 receives (201) a CMAS message transferred by emergency authority system 130 for transfer to users over wireless communication network 120, the CMAS message accompanied by a payload list of wireless access nodes that are affected by the CMAS message. In this example, CMAS message 150 is received over link 144 for distribution over at least a portion of wireless communication network 120. CMAS message 150 includes a payload list which can indicate one or more wireless access nodes that are within a geographic area over which CMAS message 150 applies. The payload list can comprise a CMAS warning list.

Management node 110 processes (202) CMAS message 150 and the payload list to determine if one or more wireless access nodes associated with a tracking area handled by the management node 110 are indicated by the payload list. In some examples, CMAS message 150 identifies at least one tracking area that is affected by CMAS message 150. A tracking area can comprise one or more wireless access nodes distributed over a geographic area. A tracking area is typically employed to distribute paging information among a subset of wireless access nodes of an entire wireless communication network, such for delivery of text messages or voice call paging. In FIG. 1, two tracking areas are associated with wireless communication network 120, although a different number could instead be included. Tracking area 1 includes wireless access nodes 121-123, while tracking area 2 can include one or more wireless access nodes as well.

For tracking area 1, management node 110 determines if any of wireless access nodes 121-123 are indicated by the payload list that accompanies CMAS message 150. When the one or more wireless access nodes associated with the tracking area are indicated by the payload list, management node 110 determines (203) a trimmed payload list that includes at least one of the wireless access nodes associated with the tracking area and omits at least wireless access nodes not associated with the tracking area. The payload list can comprise identifiers for many wireless access nodes, and transferring the payload list with CMAS message 150 for delivery to all wireless access nodes across all tracking areas that are indicated by CMAS message 150 can create bandwidth problems for wireless communication network 120. Management node 110 trims the payload list into tracking area-based portions. If no wireless access nodes for a particular tracking area are indicated in the payload list, then CMAS message 150 need not identify a trimmed payload for that particular tracking area.

Management node 110 transfers (204) the CMAS message with the trimmed payload list for delivery to the at least one of the wireless access nodes. Once management node 110 trims the payload list into tracking area-based portions, management node 110 can transfer an associated trimmed payload list along with CMAS message 150 for delivery to wireless access nodes in each individual tracking area. If no wireless access nodes for a tracking area are indicated in the payload list, then CMAS message 150 need not be delivered to wireless access nodes of that tracking area. Thus, if the payload list of CMAS message 150 identifies one or more of wireless access nodes 121-123, then management node 110 can trim the payload list for tracking area 1 to identify only the ones of wireless access nodes 121-123 identified in the untrimmed payload list, and transfer CMAS message 150 with the trimmed payload list for delivery to ones of wireless access nodes 121-123 of tracking area 1. Further trimmed payload lists can be determined for tracking area 2, and any other tracking areas identified by CMAS message 150.

In other examples, management node 110 determines individualized payload lists for each wireless access node. The payload list included with CMAS message 150 can indicate many wireless access nodes, and the payload list can be trimmed by management node 110 to include only a single wireless access node. This payload list that identifies only a single wireless access node can be transferred along with CMAS message 150 for delivery to the single wireless access node. Further individual wireless access nodes can have individualized and trimmed payload lists as well.

Figure 3:
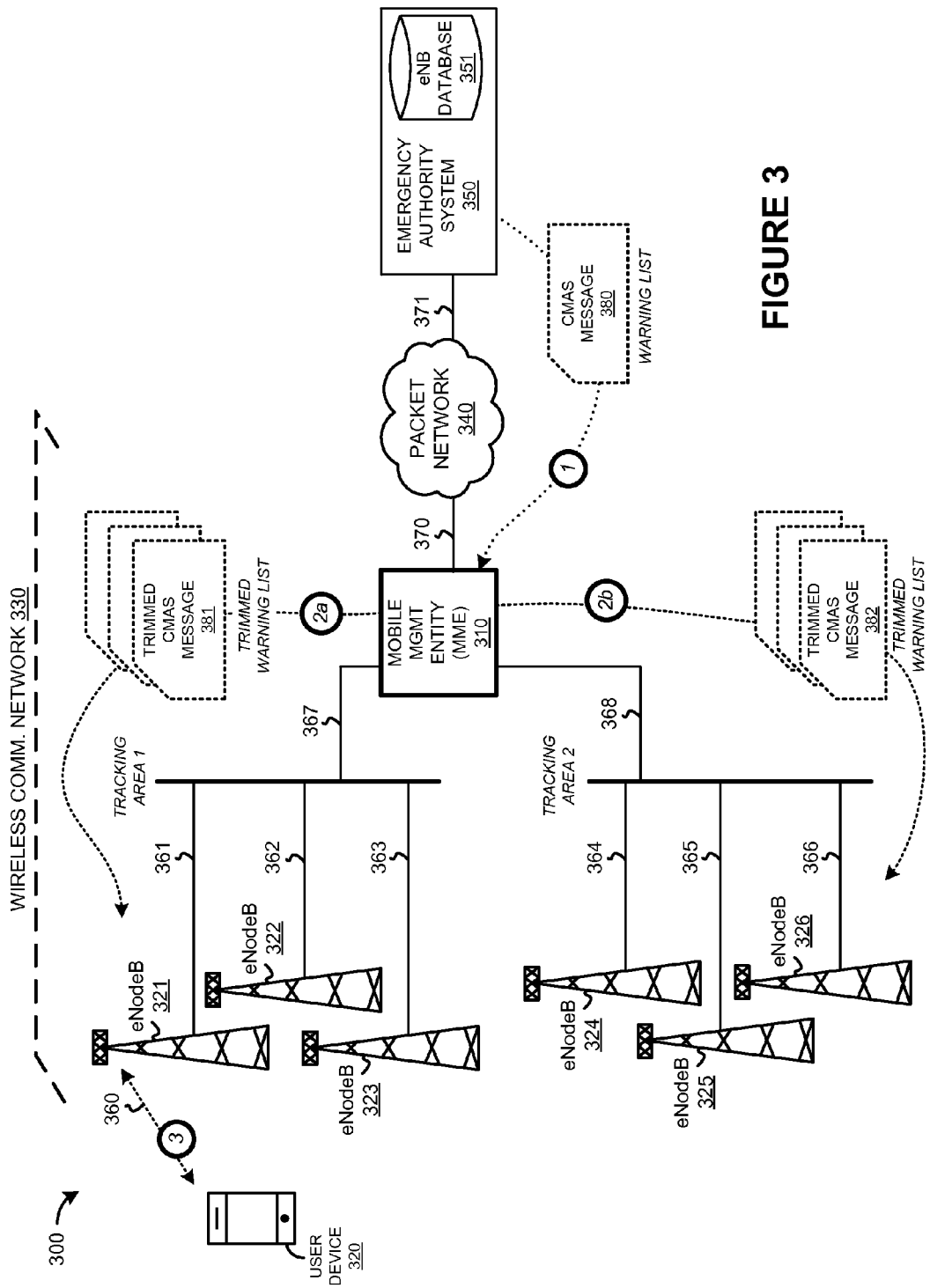
FIG. 3 is a system diagram illustrating a communication system.

FIG. 3 is a system diagram illustrating communication system 300. Communication system 300 includes mobile management entity (MME) 310, user device 320, E-UTRAN Node B equipment (eNodeB) 321-326, packet network 340, and emergency authority system 350. MME 310 and eNodeBs 321-323 communicate over network link 367 which includes backhaul links 361-363. MME 310 and eNodeBs 324-326 communicate over network link 368 which includes backhaul links 364-366. In some examples, each of backhaul links 361-366 comprise LTE S1 links. MME 310 and emergency authority system 350 communicate over packet network 340 using at least packet links 370-371. User device 320 and eNodeB 321 communicate over wireless link 360, which is an LTE wireless link in this example. In FIG. 3, MME 310 and eNodeBs 321-326 are included in wireless communication network 330. Wireless communication network 330 can include further communication and network elements, such as those described herein for wireless communication system 120.

In operation, eNodeBs 321-326 are distributed over a geographic area and provide associated areas of wireless coverage for user devices, such as user device 310. User device 320, along with other user devices not pictured for clarity, can receive wireless access to communication services from any of eNodeBs 321-326. eNodeBs 321-326 are grouped into two groups in FIG. 3, namely tracking area 1 and tracking area 2. These tracking areas are used to subdivide a large wireless communication network into smaller segments for efficient distribution of paging information to user devices, such as voice call paging, text messaging, and other network overhead communications.

MME 310 can control the operations of eNodeBs 321-326, such as by handling authorization of user devices, distributing paging communications, assisting with handoffs of user devices between ones of eNodeBs 321-326, among other operations. MME 310 also receives and distributes emergency messages for delivery to user devices. These emergency messages can comprise CMAS messages, which may or may not be accompanied by a warning list that indicates specific eNodeBs that are affected by the CMAS message.

Emergency authority system 350 originates CMAS messages and determines associated payloads such as warning lists to accompany the CMAS messages. In this example, emergency authority system 350 includes a database, namely eNodeB (eNB) database 351. eNB database 351 includes one or more data structures which relate geographic areas to eNodeB identifiers and tracking areas.

Figure 4A:
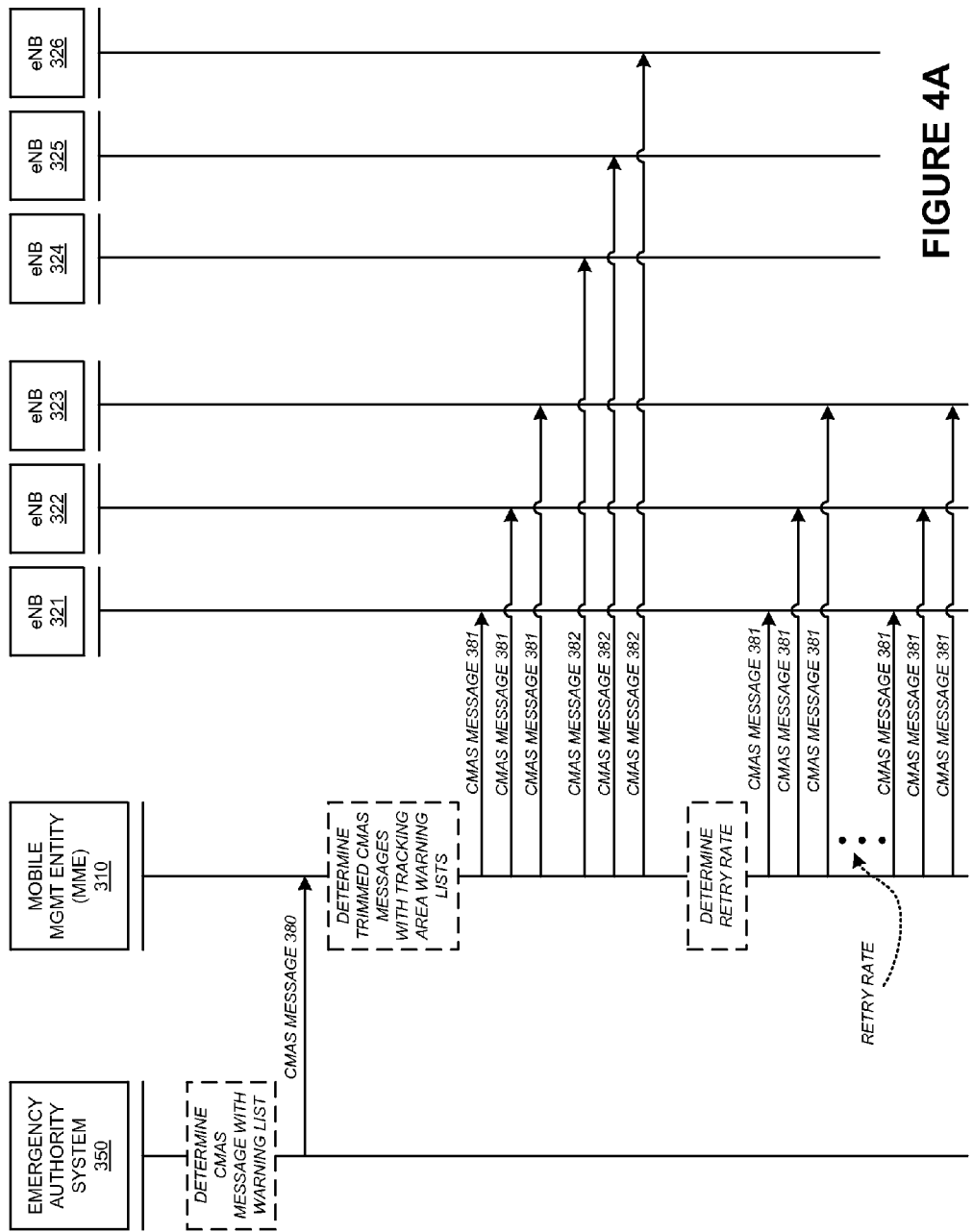
FIG. 4A is a sequence diagram illustrating a method of operation of a communication system.

As a first example operation of the elements of FIG. 3, FIG. 4A is presented. FIG. 4A is a sequence diagram illustrating an example method of operating communication system 300. In FIG. 4A, emergency authority system 350 determines CMAS message 380 for delivery to user devices over wireless communication network 330. Emergency authority system 350 also determines a warning list payload to accompany the CMAS message. The CMAS message can be generated in response to an emergency event, presidential alert, abduction, or other emergency events.

During generation of a CMAS message, emergency authority system 350 can select a geographic area that is affected by the CMAS message. eNB database 351 can be referenced to identify specific eNodeBs that are in the selected geographic area. These specific eNodeBs can then be used to create a warning list payload for the CMAS message. Also, the CMAS message includes specific tracking areas that are affected by the CMAS message. Similar to the warning list, the tracking areas can be identified using a database which relates the selected geographic area to one or more tracking areas in the selected geographic area.

Once CMAS message 380 and the associated warning list have been generated by emergency authority system 350, CMAS message 380 is transferred for distribution over wireless communication network 330. Emergency authority system 350 transfers CMAS message 380 over links 370-371 and packet network 340 for delivery to MME 310. The transfer of CMAS message 380 can be seen as operation '1' in FIG. 3.

MME 310 processes CMAS message 380 and the warning list to determine if any of the tracking areas indicated by CMAS message 380 are handled by MME 310. When none of the tracking areas are handled by MME 310, then MME 310 can ignore CMAS message 380. When at least one of the tracking areas indicated by CMAS message 380 are handled by MME 310, then MME 310 processes CMAS message 380 and the warning list to determine if one or more eNodeBs associated with the tracking areas handled by MME 310 are indicated by the warning list.

When the one or more eNodeBs associated with the tracking areas handled by MME 310 are indicated by the warning list, then MME 310 determines one or more trimmed CMAS messages for delivery to the affected tracking area. For example, if in a first tracking area, several eNodeBs are identified in the warning list, then MME 310 determines a trimmed CMAS message with a trimmed warning list that includes only the eNodeBs that are within the first tracking area. In some examples, the warning list includes all eNodeBs of a particular tracking area, but eNodeBs that are not associated with the particular tracking area are removed from the trimmed warning list. The trimmed CMAS message with the trimmed warning list can be transferred to the associated eNodeBs for the tracking area. If more than one tracking area is indicated by the CMAS message, and multiple trimmed CMAS messages can be determined, with each trimmed CMAS message including a trimmed warning list that only includes eNodeBs that are associated with each individual tracking area.

As a specific example, FIG. 4A shows two trimmed CMAS messages, each with an associated trimmed warning list. CMAS message 381 is transferred for delivery over tracking area 1, which includes eNodeBs 321-323. CMAS message 381 is transferred over network link 367 and backhaul links 361-363, as indicated by operation '2a' in FIG. 3. CMAS message 382 is transferred for delivery over tracking area 2, which includes eNodeBs 324-326. CMAS message 382 is transferred over network link 368 and backhaul links 364-366, as indicated by operation '2b' in FIG. 3.

CMAS message 381 includes a warning list payload for only eNodeBs that are within tracking area 1, and CMAS message 382 includes a warning list payload for only eNodeBs that are within tracking area 2. Once the associated CMAS messages are received by the proper eNodeBs, then the eNodeBs transfer the CMAS messages to user devices that presently receive wireless access from the eNodeBs. For example, CMAS message 381 is transferred by eNodeB 321 over wireless link 360 to user device 310, as shown by operation '3' in FIG. 3. The user devices can responsively report the CMAS message contents via a graphical user interface to associated users.

Typically, each eNodeB will respond with an acknowledgement if it receives the CMAS message properly. However, many times a particular eNodeB might not receive the CMAS message properly, or be too busy to respond with an acknowledgement. In such cases, MME 310 can establish a retry regime to ensure delivery of the CMAS messages. In FIG. 4A, CMAS message 1 is retried periodically until each affected eNodeB responds with an acknowledgement to the CMAS message. It should be noted that during retry attempts for eNodeBs in tracking area 1, CMAS message 381 is resent to eNodeBs of tracking area 1 that need CMAS message 381 resent. Likewise, during retry attempts for eNodeBs in tracking area 2, CMAS message 382 is resent to eNodeBs of tracking area 2 that need CMAS message 382 resent.

Figure 4B:
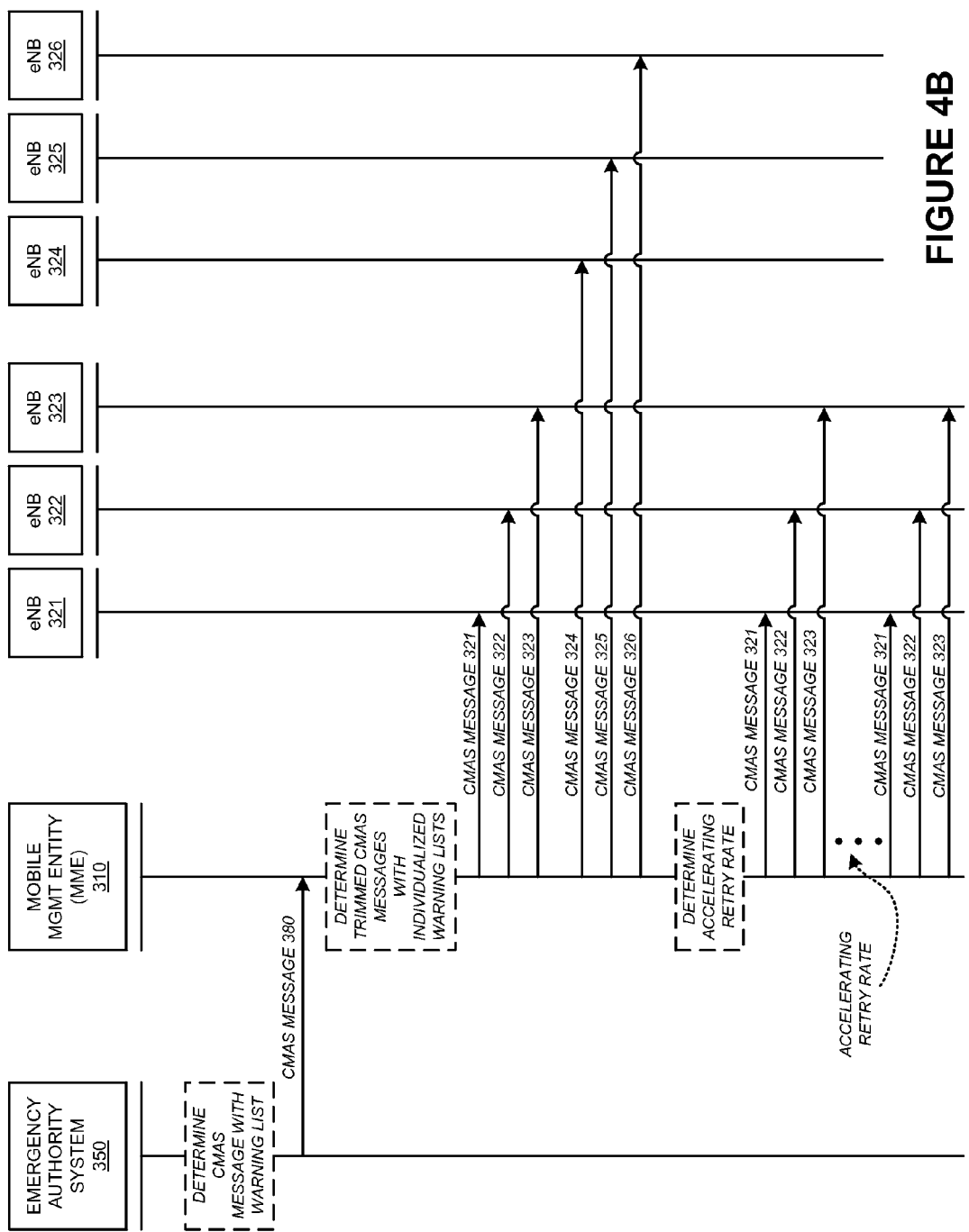
FIG. 4B is a sequence diagram illustrating a method of operation of a communication system.

As a further example of CMAS message handling in a wireless communication network, FIG. 4B is presented. FIG. 4B is a sequence diagram illustrating an example method of operating communication system 300. In FIG. 4B, emergency authority system 350 determines CMAS message 380 for delivery to user devices over wireless communication network 330. Emergency authority system 350 also determines a warning list payload to accompany the CMAS message. The CMAS message can be generated in response to an emergency event, presidential alert, abduction, or other emergency events.

During generation of a CMAS message, emergency authority system 350 can select a geographic area that is affected by the CMAS message. eNB database 351 can be referenced to identify specific eNodeBs that are in the selected geographic area. These specific eNodeBs can then be used to create a warning list payload for the CMAS message. Also, the CMAS message includes specific tracking areas that are affected by the CMAS message. Similar to the warning list, the tracking areas can be identified using a database which relates the selected geographic area to one or more tracking areas in the selected geographic area.

Once CMAS message 380 and the associated warning list have been generated by emergency authority system 350, CMAS message 380 is transferred for distribution over wireless communication network 330. Emergency authority system 350 transfers CMAS message 380 over links 370-371 and packet network 340 for delivery to MME 310. The transfer of CMAS message 380 can be seen as operation '1' in FIG. 3.

MME 310 processes CMAS message 380 and the warning list to determine if any of the tracking areas indicated by CMAS message 380 are handled by MME 310. When none of the tracking areas are handled by MME 310, then MME 310 might ignore CMAS message 380. However, MME 310 can issue a message back to emergency authority system 350 that indicates when an invalid tracking area is indicated. In further examples, such as presidential alerts, no tracking areas are typically indicated since all tracking areas are affected. When at least one of the tracking areas indicated by CMAS message 380 are handled by MME 310, then MME 310 processes CMAS message 380 and the warning list to determine if one or more eNodeBs associated with the tracking areas handled by MME 310 are indicated by the warning list.

When the one or more eNodeBs associated with the tracking areas handled by MME 310 are indicated by the warning list, then MME 310 determines one or more individualized CMAS messages for delivery to the affected eNodeBs. For example, if in a first tracking area, several eNodeBs are identified in the warning list, then MME 310 determines a several trimmed CMAS messages with individualized warning lists that each a particular eNodeB. In some examples, the warning list includes many eNodeBs of a particular tracking area, but each individualized warning list only includes a single eNodeB, and other eNodeBs are removed from the individualized warning list. The trimmed CMAS messages with the individualized warning lists can be transferred to the associated eNodeBs. Thus, a one-to-one relationship between eNodeBs and trimmed CMAS messages is established.

As a specific example, FIG. 4B shows six trimmed CMAS messages, each with an associated individualized warning list. CMAS message 321 is transferred for delivery to eNodeB 321, CMAS message 322 is transferred for delivery to eNodeB 322, CMAS message 323 is transferred for delivery to eNodeB 323, CMAS message 324 is transferred for delivery to eNodeB 324, CMAS message 325 is transferred for delivery to eNodeB 325, and CMAS message 326 is transferred for delivery to eNodeB 326. CMAS messages 321-323 are transferred over network link 367 and associated backhaul links 361-363, as indicated by operation '2a' in FIG. 3. CMAS messages 324-326 are transferred over network link 368 and associated backhaul links 364-366, as indicated by operation '2b' in FIG. 3.

CMAS message 321 includes a warning list payload for only eNodeB 321, CMAS message 322 includes a warning list payload for only eNodeB 322, CMAS message 323 includes a warning list payload for only eNodeB 323, CMAS message 324 includes a warning list payload for only eNodeB 324, CMAS message 325 includes a warning list payload for only eNodeB 325, and CMAS message 326 includes a warning list payload for only eNodeB 326. Once the associated CMAS messages are received by the proper eNodeBs, then the eNodeBs transfer the CMAS messages to user devices that presently receive wireless access from the eNodeBs. For example, CMAS message 321 is transferred by eNodeB 321 over wireless link 360 to user device 310, as shown by operation '3' in FIG. 3. The user devices can responsively report the CMAS message contents via a graphical user interface to associated users.

Typically, each eNodeB will respond with an acknowledgement if it receives the CMAS message properly. However, at times a particular eNodeB might not receive the CMAS message properly, or be too busy to respond with an acknowledgement. In such cases, MME 310 can establish a retry regime to ensure delivery of the CMAS messages. In FIG. 4B, each of the individualized CMAS messages are retried periodically until the affected eNodeB responds with an acknowledgement to the individualized CMAS message. It should be noted that during retry attempts for a particular eNodeB, only the individualized CMAS message is resent to the affected eNodeB.

MME 310 can identify a retry period and a number of retries for transmitting CMAS message 380 for delivery to eNodeBs that are affected by CMAS message 380. The retry period and number of retries can be indicated in the warning list associated with a CMAS message, or MME 310 can determine the retry period and number of retries itself. MME 310 can identify a retry rate for repeated delivery of CMAS message 380 (or associated trimmed CMAS messages) for the number of retries.

The retry rate can be established by dividing the retry period by the number of retries. For example, a retry period can be identified to retransmit a CMAS message 60 times over the next 60 minutes. MME 310 can identify a retry rate for retransmitting the CMAS message as 60 minutes/60 retry times=1 retry per minute.

MME 310 can instead determine an accelerated or decelerated retry rate where a time delay in between subsequent retries can be reduced or increased after each retry. Thus, with an accelerating retry rate, a first retry can be sent after 5 minutes, a second retry sent after 4 minutes, a third retry after 3 minutes, and so on until the number of retries and retry period have expired. The accelerated retry rate can ensure faster retry times as the retry period nears expiration. In some examples, the accelerated retry rate can be determined by the content of the CMAS message. For example, if the CMAS message content indicates an imminent event, then the CMAS message can be retransferred more quickly during the beginning of a retry period and more slowly (decelerating) near the end of the retry period. Likewise, if the CMAS message content indicates a pre-scheduled event that is due to occur upon expiration of the retry period, then the CMAS message can be retransferred more slowly during the beginning of a retry period and more quickly (accelerating) near the end of the retry period. Other combinations of accelerated/decelerated retry rates can be determined, such as larger retry delays near the ends of the retry period, and shorter retry delays near the middle of the retry period.

Although the retries discussed above are related to individual eNodeBs responding to CMAS messages with acknowledgement messages, in further examples, the acknowledgements can instead be monitored for individual users. When individual users do not acknowledge transfer of a CMAS message, then the CMAS message can be retried or retransferred by MME 310 to the particular eNodeB or tracking area associated with the users that are not acknowledging transfer. It should also be understood that the retries discussed herein might be transferred due to a lack of acknowledgement from an eNodeB, the retries might instead be a fixed retransmission where the CMAS message is retransmitted regardless of any acknowledgements.

Figure 5:
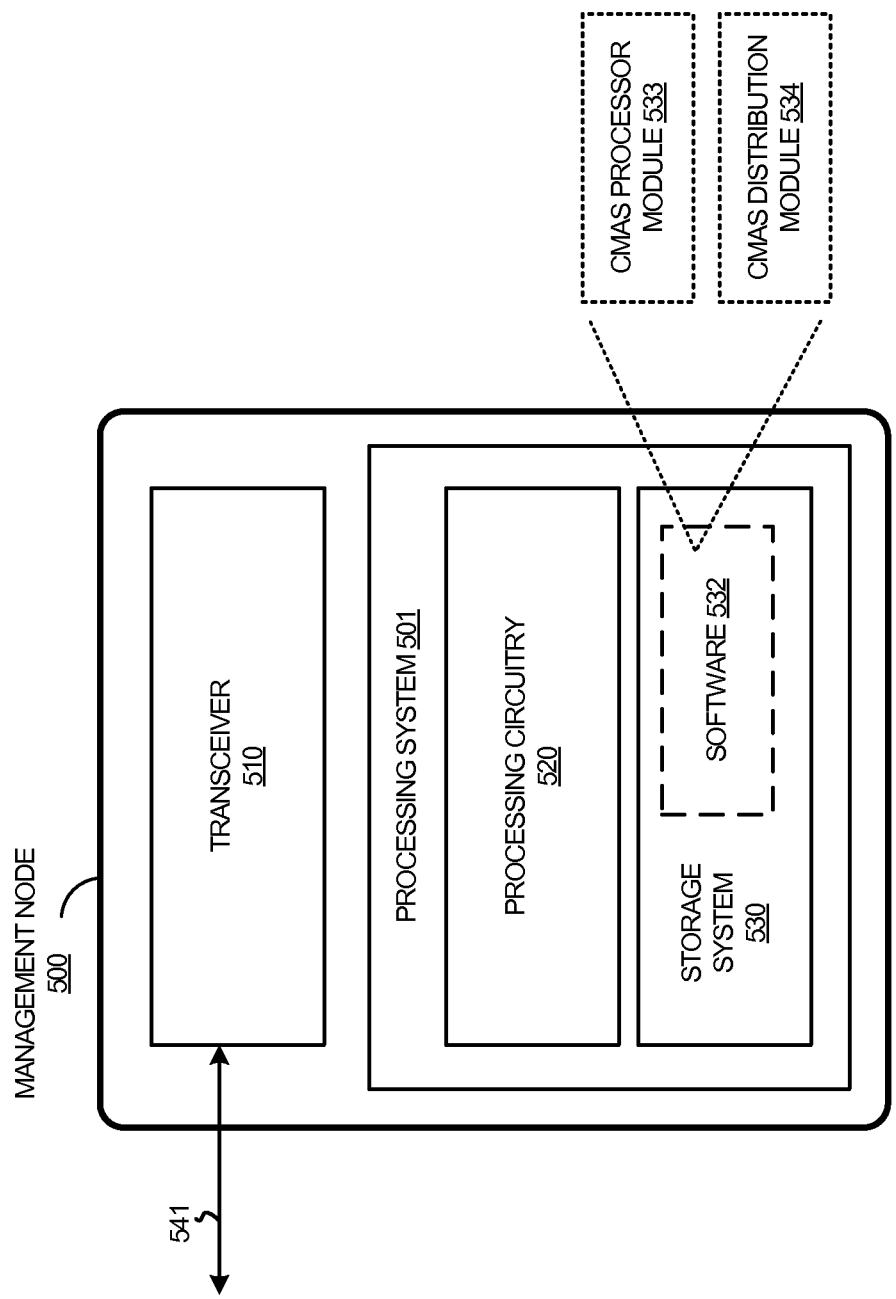
FIG. 5 is a block diagram illustrating a management node.

FIG. 5 is a block diagram illustrating a detailed view of management node 500. Management node 500 can include equipment and systems as discussed herein for management node 110 in FIG. 1 and MME 310 in FIG. 3, although variations are possible. Management node 500 includes transceiver 510 and processing system 501. Processing system 501 further includes processing circuitry 520 and storage system 530. In operation, processing circuitry 520 is operatively linked to transceiver 510 and storage system 530 by one or more communication interfaces, which can comprise busses, discrete connections, network links, software interfaces, or other circuitry. Management node 500 can be distributed or consolidated among equipment or circuitry that together forms the elements of management node 500. Management node 500 can optionally include additional devices, features, or functionality not discussed here for purposes of brevity.

Transceiver 510 includes one or more network interfaces or communication transceivers for communicating over communication networks, such as packet network 340 of FIG. 3. The network interfaces can include an Ethernet interfaces, IP interfaces, T1 interfaces, or other local or wide area network communication interfaces which can communicate over a communication link. Examples of communication transceiver 510 include network interface card equipment, transceivers, receivers, transmitters, modems, and other communication circuitry. In this example, transceiver 510 communicates over link 541. Link 541 can include one or more communication links as described herein, such as that described for links 141-144 in FIG. 1 and links 367, 368, and 370 in FIG. 3.

Processing circuitry 520 can comprise one or more microprocessors and other processing circuitry that retrieves and executes software 532 from storage system 530. Processing circuitry 520 can be implemented within a single processing device but can also be distributed across multiple processing devices or sub-systems that cooperate in executing program instructions. Examples of processing circuitry 520 include general purpose central processing units, application specific processors, and logic devices, as well as any other type of processing device, combinations, or variations thereof. In some examples, portions of processing circuitry 520 is physically separate from some elements of management node 500 and area included in remote servers, cloud-based processing systems, or virtualized computing systems.

Storage system 530 can comprise any non-transitory computer readable storage media capable of storing software 532 that is executable by processing circuitry 520. Storage system 530 can include volatile and nonvolatile, removable and non-removable media implemented in any method or technology for storage of information, such as computer readable instructions, data structures, program modules, or other data. Storage system 530 can be implemented as a single storage device but can also be implemented across multiple storage devices or sub-systems co-located or distributed relative to each other. Storage system 530 can comprise additional elements, such as a controller, capable of communicating with processing circuitry 520. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof.

Software 532 can be implemented in program instructions and among other functions can, when executed by management node 500 in general or processing circuitry 520 in particular, direct management node 500, processing system 501, or processing circuitry 520 to receive a CMAS message transferred by an emergency authority system for transfer over a wireless communication network, process the CMAS message and the payload list to determine if wireless access nodes associated with a tracking area handled by the management node are indicated by a payload list, and determine a trimmed payload list that includes at least one of the wireless access nodes, and transfer the CMAS message with the trimmed payload list for delivery to the at least one of the wireless access nodes, among other operations. Software 532 can include additional processes, programs, or components, such as operating system software, database software, or application software. Software 532 can also comprise firmware or some other form of machine-readable processing instructions executable by elements of processing system 501, such as processing circuitry 520.

In at least one implementation, the program instructions can include CMAS processor module 533 and CMAS distribution module 534. CMAS processor module 533 includes program instructions that direct processing circuitry 520 to receive a CMAS message transferred by an emergency authority system for transfer over a wireless communication network, process the CMAS message and the payload list to determine if wireless access nodes associated with a tracking area handled by the management node are indicated by a payload list, and determine a trimmed payload list that includes at least one of the wireless access nodes. CMAS distribution module 534 includes program instructions that direct processing circuitry 520 to transfer the CMAS message with the trimmed payload list for delivery to the at least one of the wireless access nodes. In some examples, CMAS distribution module 534 transfers individualized CMAS messages for delivery to individual wireless access nodes. In further examples, CMAS distribution module 534 established retry periods for transfer of the CMAS messages, which can include accelerated retries.

In general, software 532 can, when loaded into processing circuitry 520 and executed, transform processing circuitry 520 overall from a general-purpose computing system into a special-purpose computing system customized to receive a CMAS message transferred by an emergency authority system for transfer over a wireless communication network, process the CMAS message and the payload list to determine if wireless access nodes associated with a tracking area handled by the management node are indicated by a payload list, and determine a trimmed payload list that includes at least one of the wireless access nodes, and transfer the CMAS message with the trimmed payload list for delivery to the at least one of the wireless access nodes, among other operations. Encoding software 532 on storage system 530 can transform the physical structure of storage system 530. The specific transformation of the physical structure can depend on various factors in different implementations of this description. Examples of such factors can include, but are not limited to the technology used to implement the storage media of storage system 530 and whether the computer-storage media are characterized as primary or secondary storage. For example, if the computer-storage media are implemented as semiconductor-based memory, software 532 can transform the physical state of the semiconductor memory when the program is encoded therein. For example, software 532 can transform the state of transistors, capacitors, or other discrete circuit elements constituting the semiconductor memory. A similar transformation can occur with respect to magnetic or optical media. Other transformations of physical media are possible without departing from the scope of the present description, with the foregoing examples provided only to facilitate this discussion.

Referring back to FIG. 1, management node 110 comprises processing, authentication, routing, control, and network interfacing equipment. Management node 110 coordinates the transfer of network traffic for user devices, such as WCD 125, between other networks or systems. In some examples, management node 110 can include computer processing systems and equipment, communication or network interfaces, as well as computer systems, microprocessors, circuitry, cloud-based systems, or some other processing devices or software systems, and can be distributed among multiple processing devices. Examples of management node 110 can also each include software such as an operating system, logs, databases, utilities, drivers, networking software, and other software stored on a computer-readable medium.

Wireless communication network 120 comprises communication and control systems for providing access to communication services for user devices and networks. Wireless communication network 120 can provide communication services including communication routing, link bridging, network communications, data exchange, or other communication services. In some examples, wireless communication network 120 is a cellular voice and data network that can provide voice calls, text messages, data access, or other communication services provided over cellular or wireless communication networks. In some examples, wireless communication network 120 includes equipment to provide wireless access to communication services within different coverage areas to user devices, route communications between content providers and user devices, and facilitate handoffs between equipment of different coverage areas, among other operations. Wireless communication network 120 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Policy and Charging Rules Function nodes (PCRF), packet data network gateways (PGW), serving gateways (SGW), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Wireless access nodes 121-123 are each associated with wireless communication network 120, and provide wireless links for wireless access to the communication services of wireless communication network 120 within a geographic area. Wireless access nodes 121-123 each comprise RF communication and control circuitry, transceivers, and antennas, as well as wireless communications equipment capable of communicating with and providing wireless access within a wireless coverage area to communication services for wireless communication devices, such as wireless communication device 125. The RF communication circuitry typically includes amplifiers, filters, RF modulators, transceivers, and signal processing circuitry. Wireless access node 110 can also comprise elements such as base stations, base transceiver stations (BTS), E-UTRAN Node B equipment, eNodeB equipment, Evolved Node B equipment, Evolved Universal Terrestrial Radio Access (E-UTRA) network equipment.

Wireless communication device (WCD) 125 comprises one or more antennas, transceiver circuitry elements, and communication elements. The transceiver circuitry typically includes amplifiers, filters, modulators, and signal processing circuitry. Wireless communication device 125 can also include user interface systems, memory devices, non-transitory computer-readable storage mediums, software, processing circuitry, or some other communication components. Wireless communication device 125 can be a user device, subscriber equipment, customer equipment, access terminal, smartphone, telephone, mobile wireless telephone, personal digital assistant (PDA), computer, e-book, mobile Internet appliance, wireless network interface card, media player, game console, or some other wireless communication apparatus, including combinations thereof.

Emergency authority system 130 comprises computer processing systems and equipment. Emergency authority system 130 can include communication or network interfaces, as well as computer systems, microprocessors, circuitry, cloud-based systems, or some other processing devices or software systems, and can be distributed among multiple processing devices. Examples of emergency authority system 130 can also include software such as an operating system, logs, databases, utilities, drivers, networking software, and other software stored on a computer-readable medium.

Communication links 141-144 each use metal, glass, optical, air, space, or some other material as the transport media. Communication links 141-144 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Communication links 141-144 can each be a direct link or can include intermediate networks, systems, or devices, and can include a logical network link transported over multiple physical links. Communication links 141-144 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Communication link 140 includes one or more wireless links, and use the air or space as the transport media. Communication link 140 comprises one or more wireless communication links provided over an associated wireless frequency spectrum or wireless frequency band, and can use various protocols. In this example, communication link 140 can each comprise Long Term Evolution (LTE), LTE Advanced, Code Division Multiple Access (CDMA), Evolution-Data Optimized (EVDO), single-carrier radio transmission technology link (1xRTT), Global System for Mobile Communication (GSM), Universal Mobile Telecommunications System (UMTS), High Speed Packet Access (HSPA), Radio Link Protocol (RLP), 3rd Generation Partnership Project (3GPP) Worldwide Interoperability for Microwave Access (WiMAX), Orthogonal Frequency-Division Multiple Access (OFDMA), Single-carrier frequency-division multiple access (SC-FDMA), Wideband Code Division Multiple Access (W-CDMA), Time Division Synchronous Code Division Multiple Access (TD-SCDMA), IEEE 802.11, Wireless Fidelity (Wi-Fi), or some other cellular or wireless communication format, including combinations, improvements, or variations thereof.

Although one main link for each of links 140-144 is shown in FIG. 1, it should be understood that links 140-144 are merely illustrative to show communication modes or access pathways. In other examples, further links can be shown, with portions of the further wireless links shared and used for different communication sessions or different content types, among other configurations.

The included descriptions and figures depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed:

1. A method of operating a management node in a wireless communication network to transfer Commercial Mobile Alert System (CMAS) messages, the method comprising:
   receiving a CMAS message transferred by an emergency authority system for transfer to users over the wireless communication network, the CMAS message accompanied by a payload list of wireless access nodes that are affected by the CMAS message;
   processing at least the CMAS message and the payload list to determine if one or more wireless access nodes associated with a tracking area handled by the management node are indicated by the payload list;

when the one or more wireless access nodes associated with the tracking area are indicated by the payload list, determining a trimmed payload list that includes at least one of the wireless access nodes associated with the tracking area and omits at least wireless access nodes not associated with the tracking area;

transferring the CMAS message with the trimmed payload list for delivery to the at least one of the wireless access nodes; and identifying when individual users associated with the one or more wireless access nodes associated with the tracking area do not receive the CMAS message, and retrying delivery of the CMAS message to wireless access nodes associated with the individual users.

2. The method of claim 1, further comprising:
when the one or more wireless access nodes associated with the tracking area are indicated by the payload list, determining the trimmed payload list to include only a single one of the wireless access nodes, and transferring the CMAS message with the trimmed payload list for delivery to the single one of the wireless access nodes.

3. The method of claim 1, further comprising:
when the one or more wireless access nodes associated with the tracking area are indicated by the payload list, determining individualized trimmed payload lists, with each of the individualized trimmed payload lists including a different one of the one or more wireless access nodes associated with the tracking area, and transferring the CMAS message with associated individualized trimmed payload lists for delivery to corresponding wireless access nodes.

4. The method of claim 1, further comprising:
when the one or more wireless access nodes associated with the tracking area are indicated by the payload list, determining the trimmed payload list to include all of the one or more wireless access nodes associated with the tracking area, and transferring the CMAS message with the trimmed payload list for delivery to all of the one or more wireless access nodes associated with the tracking area.

5. The method of claim 1, further comprising:
processing the CMAS message to determine if the tracking area is handled by the management node;
when the tracking area is handled by the management node, then processing the CMAS message and the payload list to determine if the one or more wireless access nodes associated with the tracking area are indicated by the payload list; and
when the tracking area is not handled by the management node, then indicating the tracking area as invalid to the emergency authority system.

6. The method of claim 1, further comprising:
identifying a retry rate for repeated delivery of the CMAS message.

7. The method of claim 6, further comprising:
identifying an accelerating retry rate as the retry rate, where a delay in between each repeated delivery of the CMAS message decreases over the number of retries.

8. The method of claim 1, wherein the management node comprises a Mobile Management Entity (MME) of the wireless communication network.

9. The method of claim 1, wherein the payload list comprises a CMAS warning list.

10. A management node of a wireless communication network, the management node comprising:

a transceiver configured to receive a CMAS message transferred by an emergency authority system for transfer to users over the wireless communication network, the CMAS message accompanied by a payload list of wireless access nodes that are affected by the CMAS message;

a processing system configured to process at least the CMAS message and the payload list to determine if one or more wireless access nodes associated with the tracking area are indicated by the payload list and to identify when individual users associated with the one or more wireless access nodes associated with the tracking area do not receive the CMAS message;

when the one or more wireless access nodes associated with the tracking area are indicated by the payload list, the processing system configured to determine a trimmed payload list that includes at least one of the wireless access nodes associated with the tracking area and omits at least wireless access nodes not associated with the tracking area; and the transceiver configured to transfer the CMAS message with the trimmed payload list for delivery to the at least one of the wireless access nodes and to retry delivery of the CMAS message to wireless access nodes associated with the individual users.

11. The management node of claim 10, comprising:
when the one or more wireless access nodes associated with the tracking area are indicated by the payload list, the processing system configured to determine the trimmed payload list to include only a single one of the wireless access nodes; and
the transceiver configured to transfer the CMAS message with the trimmed payload list for delivery to the single one of the wireless access nodes.

12. The management node of claim 10, comprising:
when the one or more wireless access nodes associated with the tracking area are indicated by the payload list, the processing system configured to determine individualized trimmed payload lists, with each of the individualized trimmed payload lists including a different one of the one or more wireless access nodes associated with the tracking area; and
the transceiver configured to transfer the CMAS message with associated individualized trimmed payload lists for delivery to corresponding wireless access nodes.

13. The management node of claim 10, comprising:
when the one or more wireless access nodes associated with the tracking area are indicated by the payload list, the processing system configured to determine the trimmed payload list to include all of the one or more wireless access nodes associated with the tracking area; and
the transceiver configured to transfer the CMAS message with the trimmed payload list for delivery to all of the one or more wireless access nodes associated with the tracking area.

14. The management node of claim 10, comprising:
the processing system configured to process the CMAS message to determine if the tracking area is handled by the management node;
when the tracking area is handled by the management node, then the processing system configured to process the CMAS message and the payload list to determine if the one or more wireless access nodes associated with the tracking area are indicated by the payload list; and when the tracking area is not handled by the management node, then the processing system configured to indicate the tracking area as invalid to the emergency authority system.

15. The management node of claim 10, comprising:
the processing system configured to identify a retry rate for repeated delivery of the CMAS message.

16. The management node of claim 15, comprising:
the processing system configured to identify an accelerating retry rate as the retry rate, where a delay in between each repeated delivery of the CMAS message decreases over the number of retries.

17. The management node of claim 10, wherein the management node comprises a Mobile Management Entity (MME) of the wireless communication network.

18. The management node of claim 10, wherein the payload list comprises a CMAS warning list.

* * * * *